UNITED STATES PATENT OFFICE.

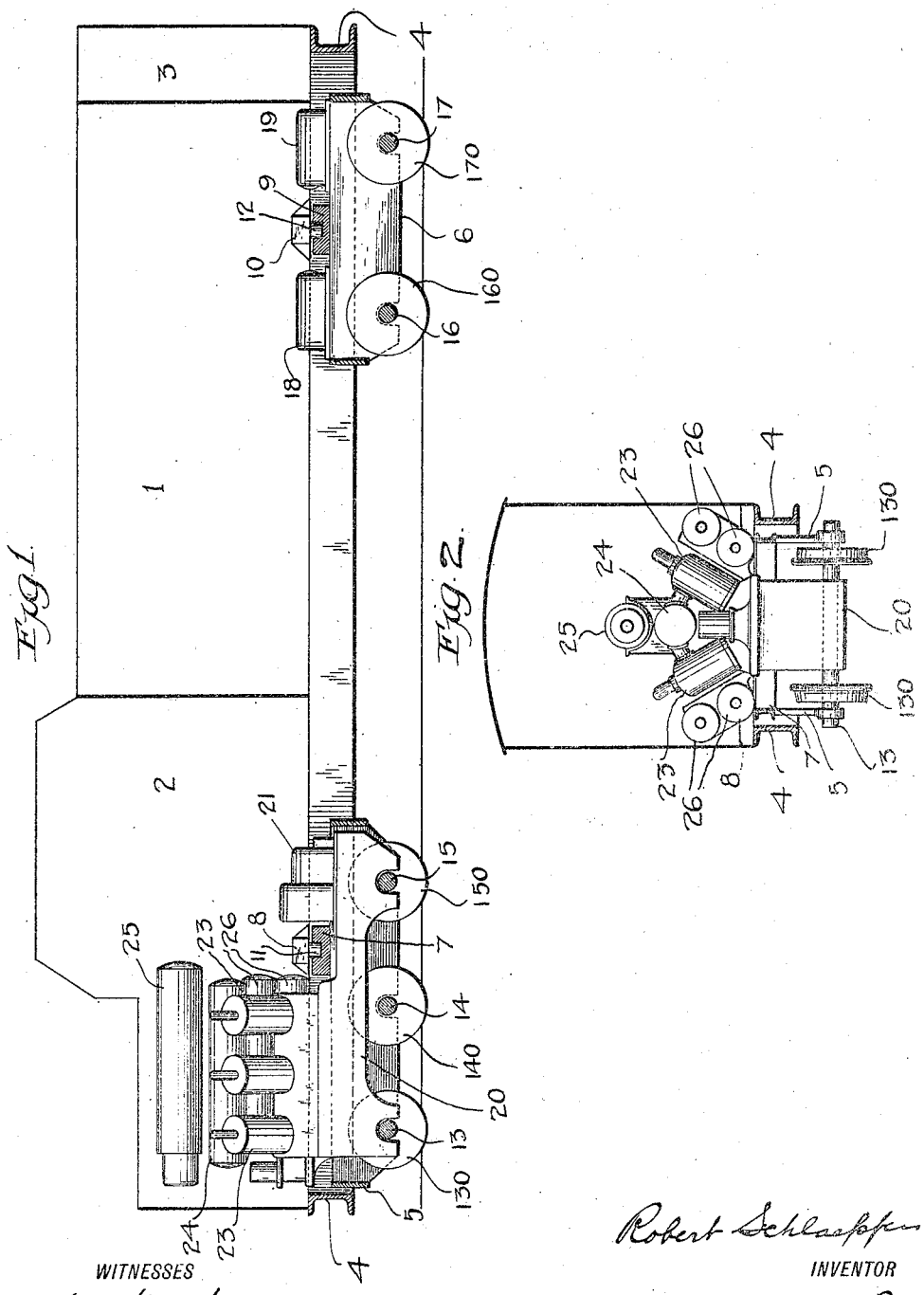

ROBERT SCHLAEPFER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

ELECTRICALLY-DRIVEN VEHICLE.

1,178,822.   Specification of Letters Patent.   Patented Apr. 11, 1916.

Application filed September 14, 1914. Serial No. 861,624.

*To all whom it may concern:*

Be it known that I, ROBERT SCHLAEPFER, engineer, a citizen of the Republic of Switzerland, residing at Winterthur, Canton of Zurich, Switzerland, have invented the following-described Improvements in Electrically-Driven Vehicles.

The invention relates to self-propelled cars, more particularly passenger cars, having an internal combustion engine electrical drive, comprising an internal combustion engine driving an electric generator to supply current to electric motors, which drive the car, the engine being preferably of the Diesel type.

The object is to avoid the transmission of vibrations from the running of the engine to the part of the car containing the passengers and the motormen, without at the same time complicating the connections of the engine with its fuel and high pressure air supplies on the one hand, and the electric generator on the other hand, by the introduction of movable joints, flexible sections, or otherwise. This is accomplished by placing the engine, together with its fuel and air tanks and the dynamo-generator which it drives on a truck frame, which is mounted on the wheel axles independent of the main car frame which contains the passengers' and motormen's compartments, the electric drive motors being disposed on one of the trucks which support the car frame.

The invention is illustrated schematically in the accompanying drawing, wherein:

Figure 1 is a simplified longitudinal section through a car embodying the invention, with the exterior truck frame in section; and Fig. 2 is a cross-section taken at the left of Fig. 1.

The portion 1 of the car body represents the space devoted to passengers, while the portions 2 and 3 are compartments for the motormen. The body rests upon an under frame 4, comprising side and end sills, supported, adjacent the ends on two swiveled truck frames 5 and 6, by means of body-and-truck frames 5 and 6, by means of body-and-truck-bolsters 7, 8 and 9, 10, and king pins 11 and 12, respectively. One of these truck frames carrying the car frame is borne on the axles 13, 14 and 15 of one set of wheels 130, 140 and 150, and the other truck frame 6, is borne on the axles 16 and 17 of the other set of wheels 160 and 170.

The driving electric motors, shown as two in number, 18 and 19, are mounted on the truck frame 6 and drive the axles 16 and 17. Both of these truck frames preferably bear on the axles outside of the wheels.

A special truck frame 20 is provided for the power installation which comprises the dynamo 21 and the Diesel engine driving it, and is mounted on one of the sets of wheel axles carrying the car frame and body but independent of the latter. To this end the said truck frame is preferably borne on the axles between the set of wheels 130, 140 and 150, the truck frame 5, supporting the car frame at this end, being formed to surround the truck frame 20, which may also extend upward within the car frame 4. Whereas the truck frame 5 is shown bearing on all three axles 13, 14 and 15, it is preferable for the truck frame 20 to rest only on the end axles 13 and 15, thereby providing a longer wheel base for that truck.

The engine preferably comprises two sets of cylinders 23 disposed side by side in diagonal, upward diverging relation, with a common exhaust manifold or muffler 24 connected between them, and a fuel tank 25 disposed centrally over the exhaust manifold. Tanks 26, holding compressed air for fuel injection and for starting, are shown ranged horizontally at the outer sides of the cylinders, and, it will be understood, are connected with the cylinders by suitable lines which need not be here described. The various parts of the power installations are shown housed within an extension of the motormen's compartment 2.

The drawings being diagrammatic in character and being directed more particularly to the points of novelty, it has not been thought necessary to illustrate the springs, the electrical connections between the dynamo and motors, or other familiar features, and it will be understood that these may be of any usual or desired character.

I claim:

In a car with internal combustion engine electrical drive, the combination with a car frame and a set of carrying wheels and axles, of a truck frame supporting the car frame and another truck frame independent of the car frame and carrying an internal combustion engine driving an electric generator to supply the current for propelling the car, both truck frames being mounted on said wheel axles and the latter truck frame bearing on a less number of axles than the former.

In testimony whereof I have signed this specification in the presence of two witnesses.

ROBERT SCHLAEPFER.

Witnesses:
 CARL GUBLER,
 BERTHA C. GROH.